(12) United States Patent
Swanger (10) Patent No.: US 6,347,484 B1
(45) Date of Patent: Feb. 19, 2002

(54) VENTILATION UNIT FOR VEHICLES

(75) Inventor: Eric D. Swanger, Huntersville, NC (US)

(73) Assignee: Specialty Manufacturing Co., Inc., Pineville, NC (US)

( * ) Notice: Subject to any disclaimer, the term of this patent is extended or adjusted under 35 U.S.C. 154(b) by 0 days.

(21) Appl. No.: 09/511,125

(22) Filed: Feb. 22, 2000

(51) Int. Cl.[7] ................................................ E05D 15/50
(52) U.S. Cl. ........................................... 49/193; 49/359
(58) Field of Search ........................ 49/192, 193, 358, 49/356, 357, 359; 52/200, 74

(56) References Cited

U.S. PATENT DOCUMENTS

| | | | | |
|---|---|---|---|---|
| 2,374,618 A | * | 4/1945 | Perreton | |
| 4,412,404 A | * | 11/1983 | Manning | 52/19 |
| 4,420,184 A | * | 12/1983 | Kaltz | 296/221 |
| 4,449,325 A | * | 5/1984 | Rawlings | 49/192 |
| 4,624,076 A | * | 11/1986 | Schoeman | 49/199 |
| 4,630,029 A | * | 12/1986 | Hayward | 340/87 |
| 4,866,882 A | * | 9/1989 | Cappello | 49/324 |
| 4,929,019 A | * | 5/1990 | Paakkonen et al. | 296/223 |
| 5,546,705 A | * | 8/1996 | Hirtsiefer | 49/386 |
| 5,675,940 A | * | 10/1997 | Bahar et al. | 52/58 |
| 6,070,637 A | * | 6/2000 | Jancan | 160/40 |

* cited by examiner

Primary Examiner—Curtis A. Cohen
(74) Attorney, Agent, or Firm—Kennedy Covington Lobdell & Hickman, LLP (57) ABSTRACT

A ventilating unit for mounting in the top wall of a vehicle that includes a frame and a panel movable between an open and a closed position in the frame. An operating mechanism is provided which includes linkages connected to opposite sides of the panel, and two electric motors connected to the linkages and independently operable to selectively raise either one, or both of the sides of the panel. At least one latching member may be included in the operating mechanism to assist in maintaining the panel in its closed position.

6 Claims, 8 Drawing Sheets

VENTILATION UNIT FOR VEHICLES

BACKGROUND OF THE INVENTION

The present invention relates generally to devices for selectively admitting ventilation air into the interior of a vehicle, and more particularly, to devices of the type which are mounted in a wall of the vehicles and which are operable to selectively open and close the ventilating device.

Most conventional passenger automobiles include a standard ventilating system that is selectively operable to admit ventilating air that passes through the passenger automobile in a predetermined flow pattern that results in the fresh outside air adequately ventilating the entire interior passenger space within the vehicle. However, in larger vehicles that are designed to carry a relatively large number of passengers, such as a school buses, airport vans, and similar larger passenger vehicles, conventional ventilation systems may not be sufficient to properly ventilate the much larger passenger space within the vehicle. This problem can be exacerbated in special circumstances that further increase the need for more ventilating air, such as larger vehicles that may not include air conditioning and are often required to sit motionless in hot sunlight for prolonged periods of time so that the inside of the vehicle becomes uncomfortably hot.

To deal with this problem, it is known that school buses and the like may be provided with ventilating devices which are mounted in the roof of the vehicle, and which can be selectively opened and closed by the operator of the vehicle to admit ventilating air into the vehicle when desired.

In one form, such known ventilating devices are operable by an electric motor to tilt upwardly the front edge and/or the rear edge of a ventilating panel, depending upon the desired flow pattern of the ventilating air. If the front edge only is tilted upwardly, fresh air from the outside is forced into the interior of the vehicle by the forward motion of the vehicle. If the rear edge only is tilted upwardly, the forward motion of the vehicle will tend to draw air outwardly from the interior of the vehicle and set-up a flow of ventilating air through the interior of the vehicle. If both the front and rear edges are raised at the same time, the entire panel is moved upwardly to a position generally parallel to it initial position to provide the maximum opening for permitting ventilating air to flow inwardly and/or outwardly through such opening.

While these known ventilating devices generally provide an adequate flow of ventilating air through the vehicle, they have the disadvantage of being somewhat difficult and time consuming to operate. More specifically, the moveable ventilating panel is operated by a single electric motor, and the panel must be moved through a predetermined sequence of steps, normally including four steps, namely:

(1) tilting the front edge of the panel upwardly;
(2) then titling the back edge of the panel upwardly;
(3) then moving the front edge of the panel downwardly to its initial position;
(4) moving the back edge of the panel downwardly so that the panel is returned to its initial, fully-closed position.

Thus, to get to a particular position of the panel, (e.g. position (3) above, with just the rear edge of the panel tilted upwardly), it may be necessary for the vehicle operator to first move the panel through several positions in the sequence (e.g. positions (1) and (2) above), all of which is time consuming for the operator and which imposes unnecessary wear on the motor and the operating mechanism.

By contrast, the present invention provides a ventilating device which overcomes the disadvantages of known ventilating devices and offers significant versatility in the operation of the device.

SUMMARY OF THE INVENTION

In accordance with the present invention, a selectively openable ventilation device is provided for use in vehicles which includes a frame mountable in a wall of the vehicle and being formed with a ventilation opening therein, and a panel having a configuration corresponding generally to the ventilation opening and having two opposed sides. A first linkage assembly connects one side of the panel to the frame for permitting movement of the one side of the panel between a first closed position at which the one side is disposed within the frame to close the ventilation opening thereat and a second open position at which the one side is disposed in a raised position above the frame to open the ventilation opening thereat. A second linkage assembly connects the other the side of the panel to the frame for permitting movement of the other side of the panel between a first closed position at which the other side is disposed within the frame to close the ventilation opening thereat and a second open position at which the other side is disposed in a raised position above the frame to open the ventilation opening thereat. A first motor is operatively connected to the first linkage assembly to selectively move the one side edge of the panel between the first and second positions thereof, and a second motor is operatively connected to the second linkage assembly to selectively move the other side edge of the panel between the first and second positions thereof, the second motor being operable independently of the first motor whereby either or both of the sides of the panel can be selectively moved toward and way from the frame to permit ventilating air to flow through the ventilation opening at either or both of the sides of the panel.

In one preferred embodiment of the present invention, the first and second motors are electric motors, each operated by a control switch mountable within the vehicle and operable to selectively move the two sides of the panel between their open and closed positions and to selectively stop such movement at any desired intermediate position between the open and closed positions.

Also, it is preferable that the first and second linkage assemblies each include a pair of spaced mounting brackets having downwardly extending slots therein, with a crossbar positioned in the slots and connected to the motor to be moved in the slots by the motor. A pair of operating links are provided, each operating link being pivotally connected at one of its ends to the crossbar and at the other of its ends to the frame of the ventilation unit, whereby when the crossbar is moved downwardly in the slots by the motor the operating links cause the one panel side to be moved from the first closed position thereof to the second open position, and when the crossbar is moved upwardly in the slots by the motor the operating links cause the one panel side to be moved from the second open position thereof to the first closed position thereof.

This preferred operating arrangement may also provide at least one of the operating links with a pin extending outwardly therefrom, and provide a latching member mounted for movement between a first latching position at which it engages the pin to maintain the one panel at its first closed position and a second release position at which it disengages the pin to permit movement of the pin in the slot in the bracket.

The latching member is preferably mounted on the bracket for sliding movement relative thereto between the first latching position and the second release position, and it is formed with a hook shaped surface positioned to engage the pin during the last portion of the aforesaid upward movement of the crossbar in the slot. The crossbar may engage the latching member to move the latching member in a direction that will cause the hook shaped surface thereof to urge the pin upwardly when the latching member is in the first latching position and thereby maintain the panel securely pressed against the frame at the first closed position thereof to seal the ventilating opening thereat.

DESCRIPTION OF THE PREFERRED EMBODIMENT

Figure 1:
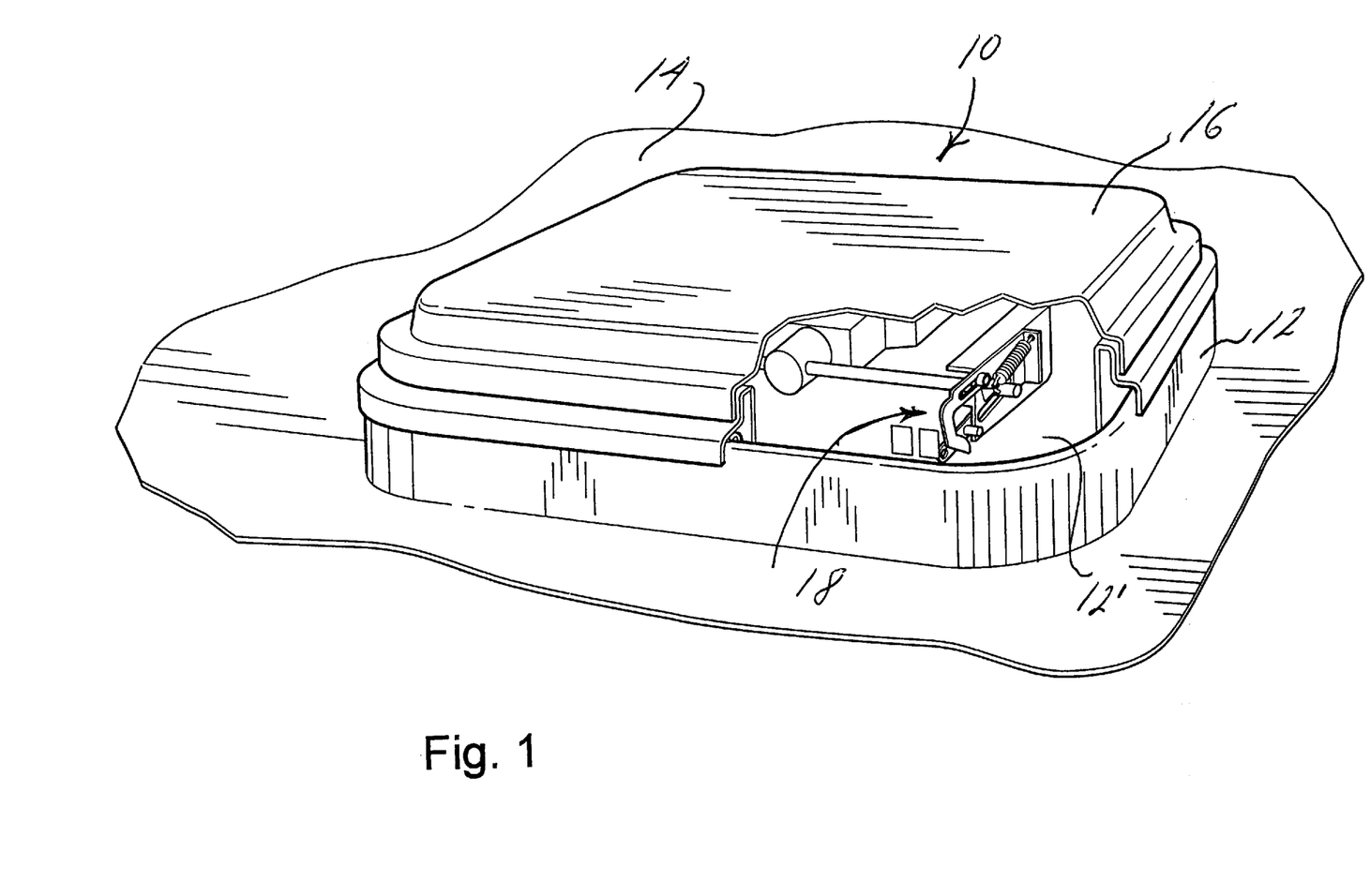
FIG. 1 is a perspective view illustrating a ventilating panel mounted in the top wall of a vehicle.

Looking now in greater detail at the accompanying drawings, FIG. 1 illustrates a selectively openable ventilation device 10 which includes a frame 12 mounted in a wall 14 of a vehicle, such as a school bus, van, or the like, and a movable panel member 16. As is well known in the art, the frame 12 is generally rectangular with the middle portion thereof forming a ventilation opening 12', and the panel 16 has a configuration corresponding generally to the ventilation opening 12' so that when the panel member 16 is in its closed position abutting the frame 12, as illustrated in FIG. 1, the ventilation opening 12' is closed, and when the panel 16 is disposed in a raised position above the frame 12, as will be explained in greater detail presently, the ventilation opening 12' is open to permit ventilating air to pass into and/or out of the vehicle.

Figure 2:
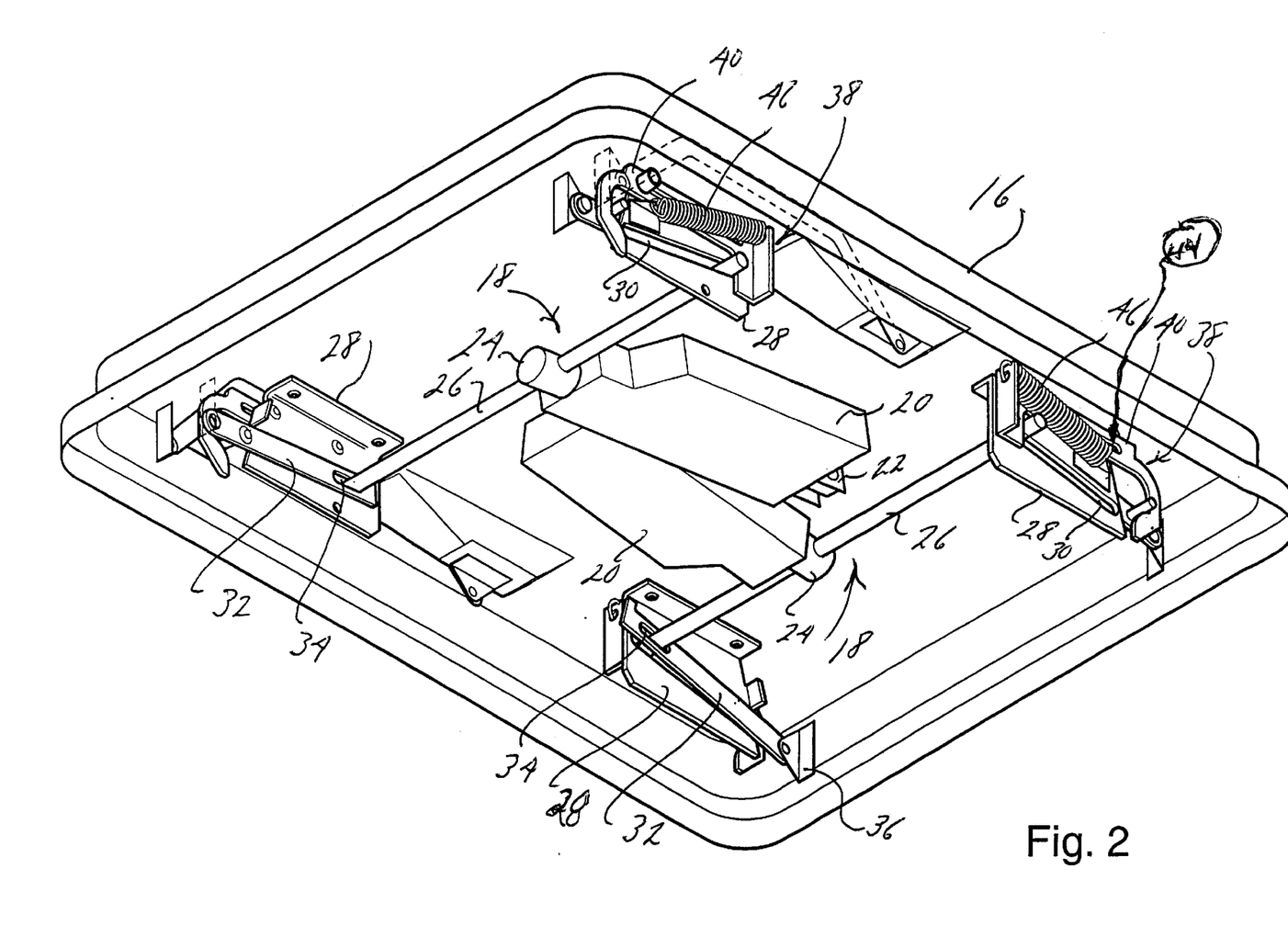
FIG. 2 is a perspective view of the operating mechanism for raising and lowering the ventilation panel, the panel itself being only partially illustrated for clarity of illustration.

The mechanism for moving the panel 16 between its open and closed positions is illustrated in FIG. 2, and this mechanism includes two identical linkage assemblies 18, one of which is connected to one side edge of the panel 16 and the other of which is attached to the opposite side edge of the panel 16 for a purpose to be described presently. Since the two linkage assemblies 18 are identical, like reference numerals have been used to identify the corresponding elements in each of the linkage assemblies 18.

Each linkage assembly 18 includes a conventional drive motor 20 having one of its ends pivotally connected to the frame 12 by pivot bracket 22. The drive motor 20 may be any type of well known reversible motors, such as a hydraulic motor, pneumatic motor or the like. However, in the preferred embodiment of the present invention, the drive motor 20 is a reversible electric motor, such as a Model LA12-2 motor manufactured by Linak A-S, located in Denmark. The drive motor 20 includes a drive rod 24 that is moved in a longitudinal path into and out of the confines of the drive motor 20. The extending end of the drive rod 24 has a crossbar 26 mounted therein to extend perpendicularly with respect to the axis of the drive rod 24.

Each of the linkage assemblies 18 also includes a pair of brackets 28 mounted within the confines of the panel 16 and formed with downwardly directed slots 30, and the opposite end portions of the crossbar 26 extend through the slots 30 for movement therein. A pair of operating links 32 are each connected at one of its ends to the opposite ends, respectively, of the crossbar 26 by a lost motion slot 34, and the other end of each of the operating links 32 is pivotally mounted to one side of the frame 12 by pivot bracket 36.

A latching assembly 38 is provided for each of the operating links 32, and these latching assemblies 38 include a latching member 40 that is mounted for sliding movement on a linkage bracket 28 by slide pin 42 secured to the linkage bracket 28 and extending outwardly through a slot 44 in the latching member 40. A coil spring 46 is secured at one of its ends to the linkage bracket 28, and at its other end to one end of the latching member 40, the coil spring 46 being arranged to normally bias the latching member 40 in a direction outwardly from the linkage bracket 28. The outermost end of the latching member 40 is formed with a hook-shaped surface portion 48, and the adjacent end of the operating link 32 is provided with a pin element 50 extending outwardly therefrom, all for a purpose to be explained in greater detail below.

The innermost end of each of the operating links 32 is formed with a projection 52 extending outwardly therefrom, and the adjacent linkage bracket 28 is provided with a flange element 54 that is positioned to be engaged by the projection 52 when the operating link 32 is at its fully-extended or raised position.

The operation of the linkage assemblies 18 is best illustrated in FIGS. 3–6, and while only one linkage assembly 18 is illustrated in these drawings, it will be understood that the other linkage assembly 18 operates in exactly the same manner.

Figure 3:
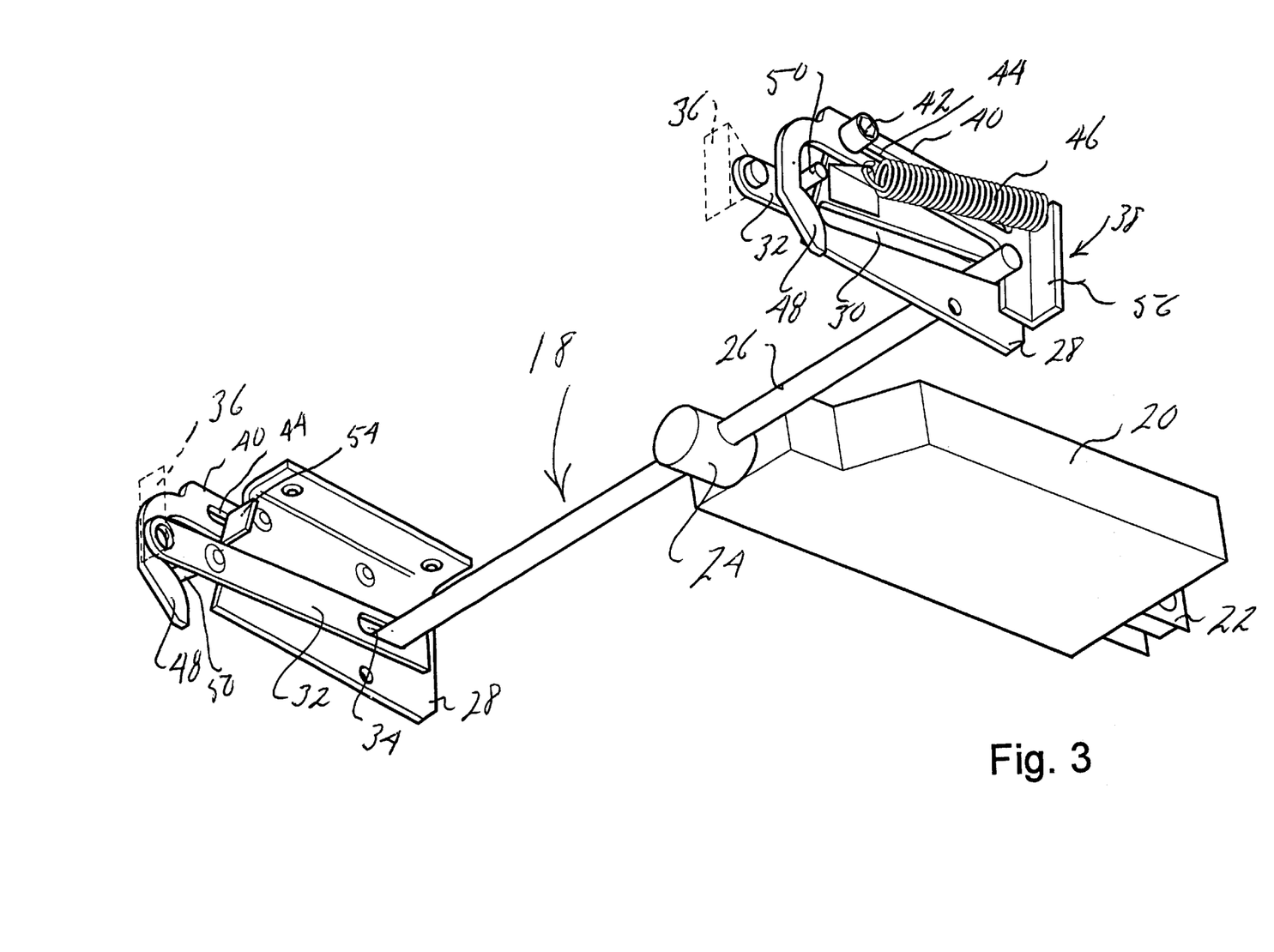
FIG. 3 is a perspective view of the operating mechanism when the panel is at its closed position, the panel itself being omitted from the drawing for clarity of illustration.

FIG. 3 illustrates the linkage assembly 18 at its position where the panel 16 is in abutment with the frame 12 to close the ventilation opening 12' therein. It will be noted that the drive rod 24 of the drive motor 20 is in its retracted position, and the extending ends of the crossbar 26 are disposed in the innermost and uppermost portion of the slots 30 in the linkage brackets 28. Additionally, the ends of the crossbar 26 extend through the slots 30 to engage an upstanding flange portion 56 of the latching members 40 so that the latching members 40 are positioned at their retracted position relative to the linkage brackets 28, and the springs 46 serve to retract the hook-shaped surface 48 in the opening mode to positively urge the hook-shaped surface 48 of the latching members 40 against the pin elements 50 whereby the hook-shaped surface portions act as a cam surface to urge, under the influence of the crossbar 26, the pin elements 50 and the attached operating links 32 in a downward direction to cause the side edge of the panel 16 to be securely pressed into closing contact with the frame 12 and assist in causing the ventilation opening 12' to be properly sealed.

Figure 4:
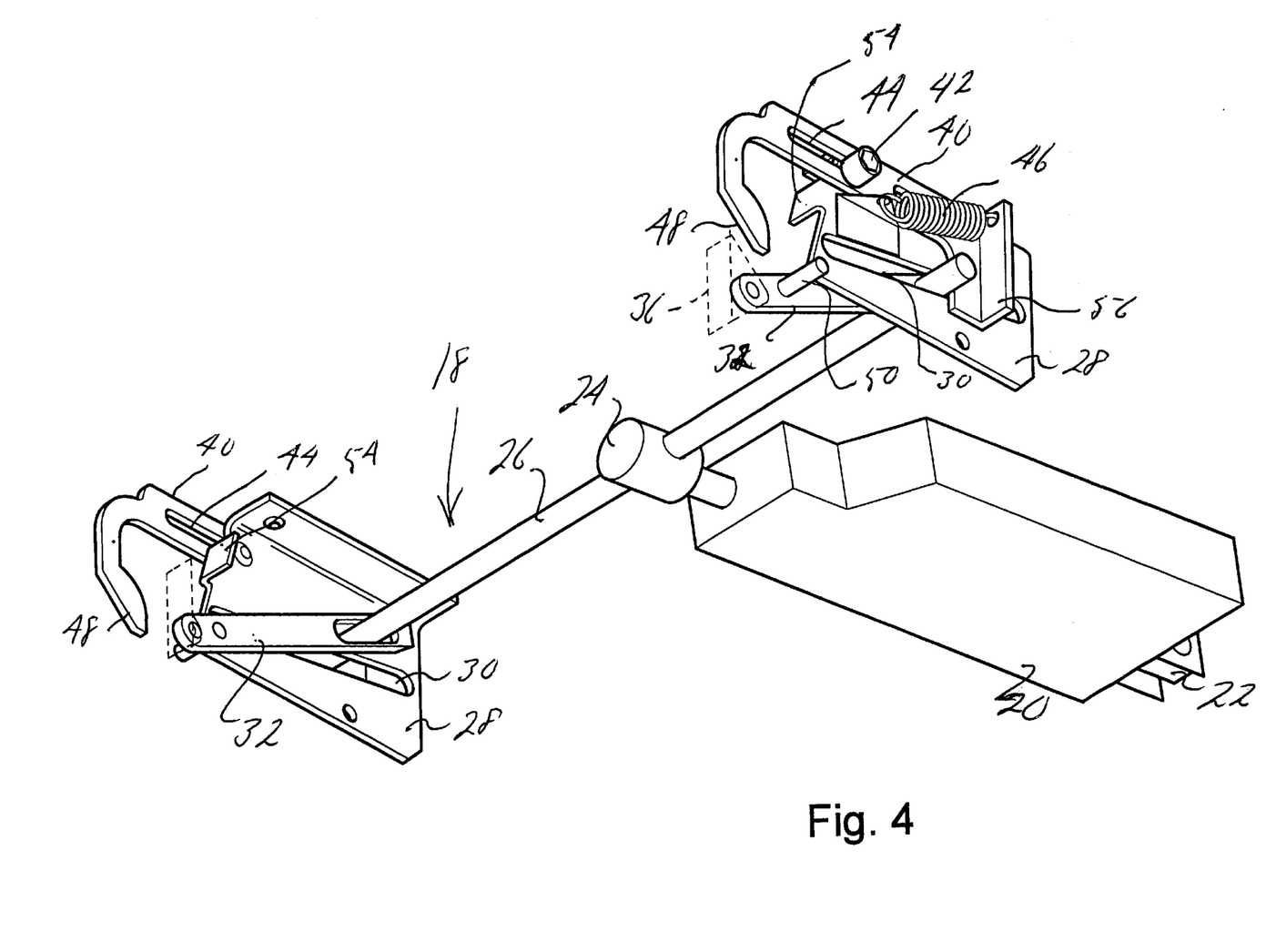
FIG. 4 is a perspective view of the operating mechanism when the panel is at an intermediate position just after the latching member has released the operating link, the panel itself being omitted from the drawing for clarity of illustration.

When it is desired to open the ventilation opening 12' by raising one of the side edges of the panel 16, the appropriate one of the electric drive motors 20 is energized and causes the drive rod 24 to move outwardly from the drive motor 20. As best seen in FIG. 4, the initial outward movement of the drive rod 24 causes the crossbar 26 to move downwardly in the slots 30 in the linkage brackets 28, and, as a result, the coil springs 46 will cause the latching members 40 to move outwardly relative to the linkage brackets 28 until the hooked-shaped surface portion 48 clears the pin elements 50 to thereby release the operating links 32.

Figure 5:
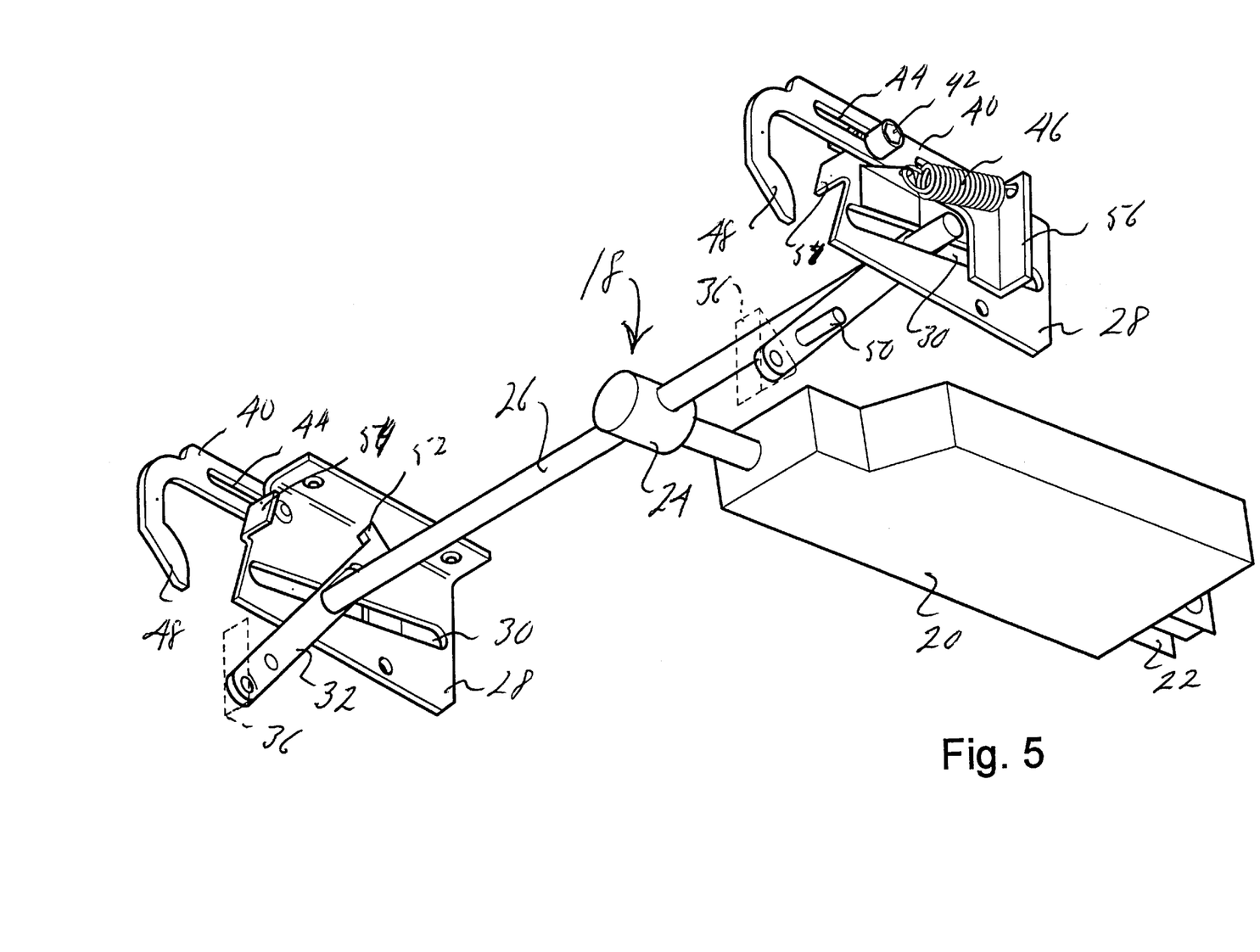
FIG. 5 is a perspective view of the operating mechanism when the panel is at another intermediate, the panel itself being omitted from the drawing for clarity of illustration.
Figure 6:
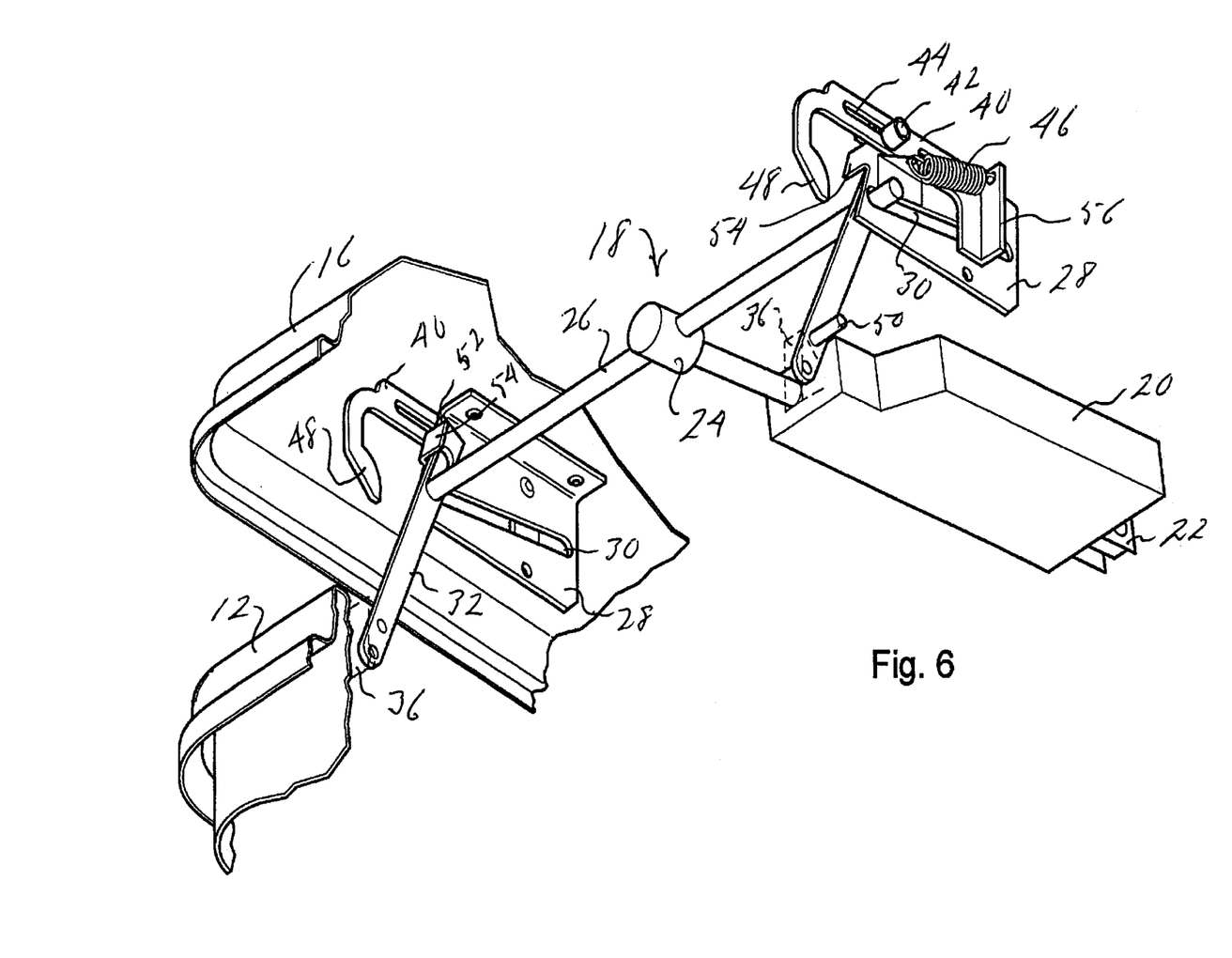
FIG. 6 is a perspective view of the operating mechanism when the panel is at its raised position, the panel itself being omitted from the drawing for clarity of illustration.

As best seen in FIG. 5, further outward movement of the drive rod 24 results in the ends of the crossbar 26 riding downwardly in the slots 30 to gradually cause the operating links 52 to pivot downwardly and raise the side edge of the panel 16 connected thereto. As best seen in FIG. 6, when the drive rod 24 is in its fully-extended position, the crossbar 26 is at the lowermost end of the slots 30 in the linkage brackets 28, and the operating links 32 are pivoted to a substantially vertical disposition so that the attached side edge of the panel 16 is at its maximum raised position. It will be noted that at the maximum raised position, the projection 52 at the lower end of the operating links 32 is in engagement with the flange 54 of the linkage brackets to assist in maintaining the operating link in its fully raised position.

Figure 10:
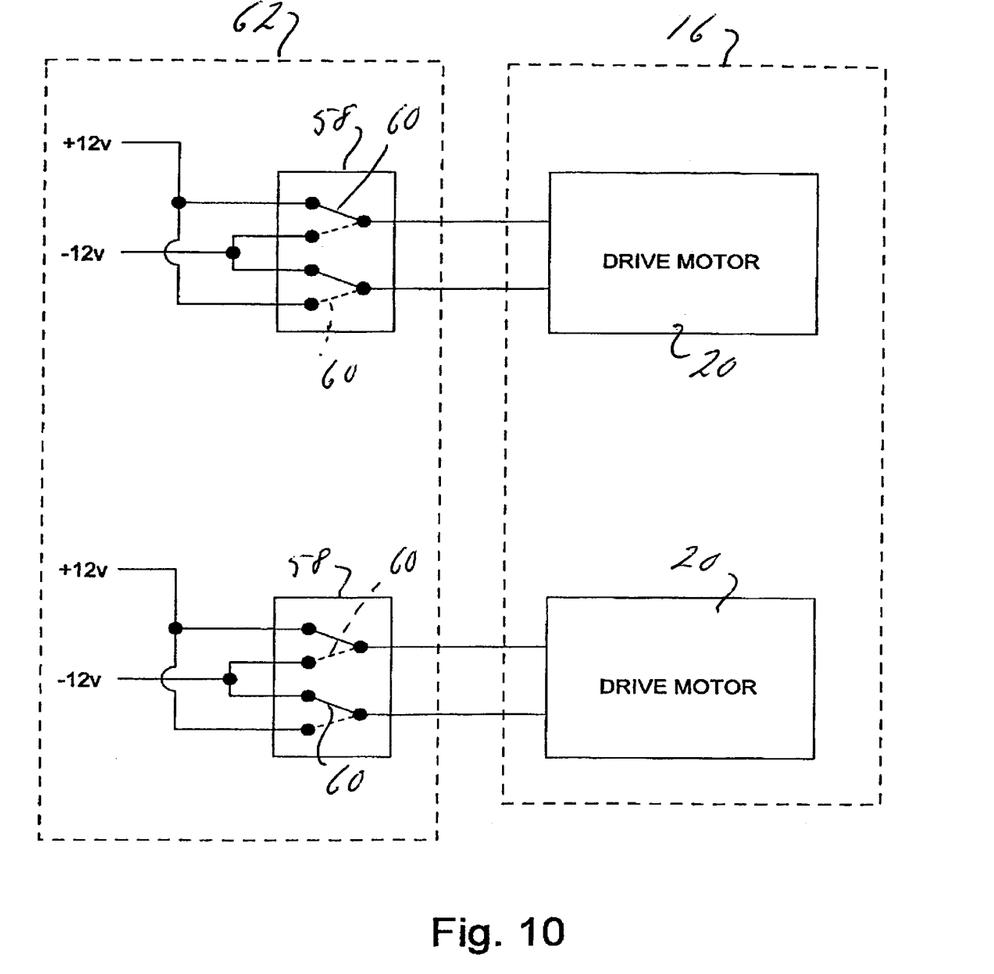
FIG. 10 is a schematic view of the electrical control system for the drive motors of the present invention.

The electrical control circuit for operating the electrical drive motors 20 is schematically illustrated in FIG. 10. As described above, the two drive motors 20 are mounted in the panel 16, which is indicated by dotted lines in FIG. 10. Additionally, a pair of conventional double pole, double throw electrical switches 58 are mounted within the vehicle, preferably somewhere that is convenient to the operator of the vehicle, such as on the dash 62 which is indicated in dotted line in FIG. 10. The two switches 58 are independently operated to permit the two drive motors to be controlled independently. Thus, when a switch element 60 is in the full line position as shown in FIG. 10, an electrical circuit in completed in one direction through the drive motor 20 to which it is connected to cause the drive motor 20 to rotate in one direction and cause the drive rod 24 thereof to move outwardly as described above until it reaches it fully extended position at which position the drive motor 20 is automatically deenergized and the side edge of the panel 16 attached to that drive motor 20 is moved to its fully extended position and remains at that position. When it is desired to move that side of the panel 16 back to its retracted position adjacent the frame 12, the operator operates the switch 58 to cause the switch element 60 to move to its dotted line position illustrated in FIG. 10, whereupon an electrical circuit is completed in the opposite direction through the drive motor 20 to reverse the operation of the drive motor 20 and retract the drive rod 24, whereby the side edge of the panel 16 moves from its raised or extended position to its retracted position.

Figure 7:
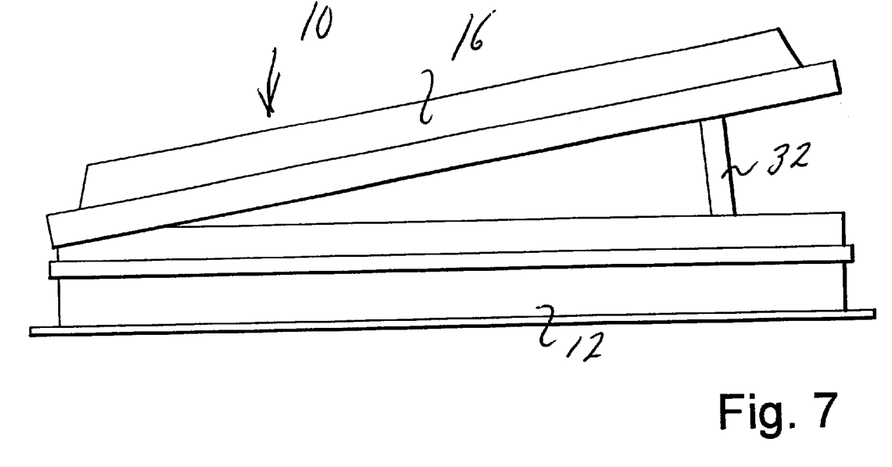
FIG. 7 is a diagrammatic view illustrating the panel with only one side thereof at its raised position relative to the frame of the ventilating unit.
Figure 8:
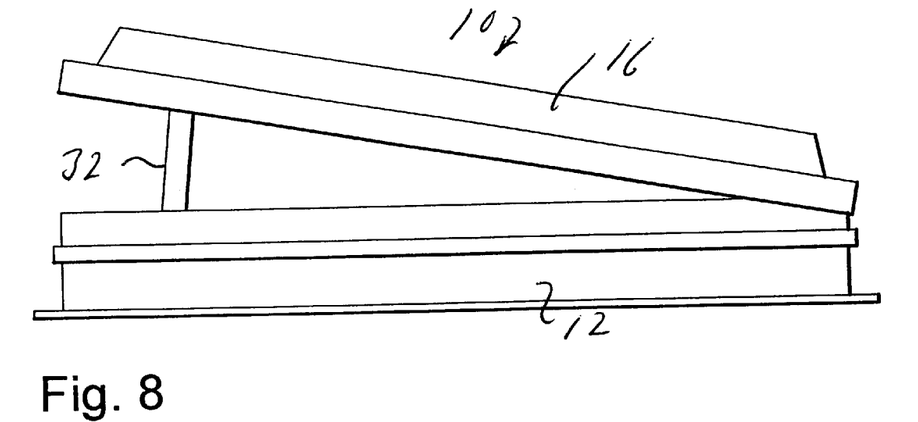
FIG. 8 is a diagrammatic view illustrating the panel with only the other side thereof at its raised position relative to the frame of the ventilating unit.
Figure 9:
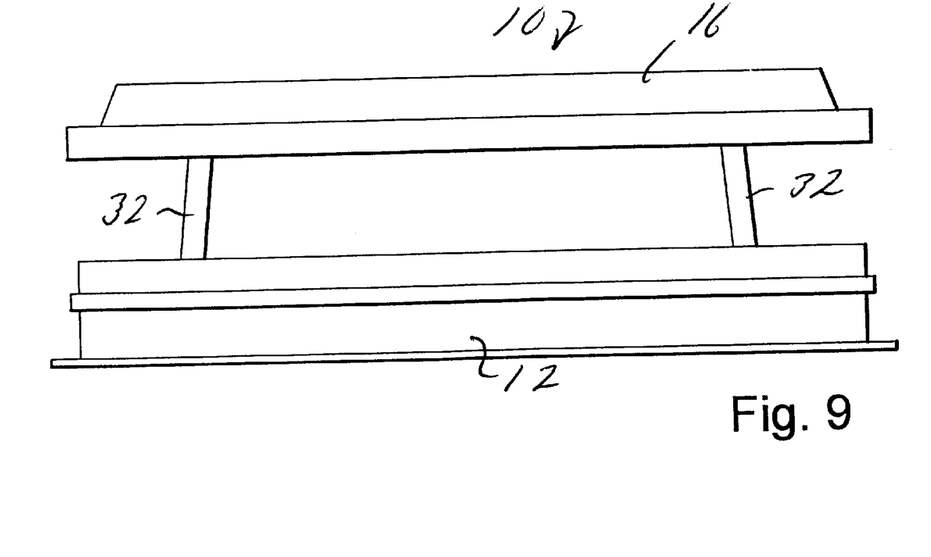
FIG. 9 is a diagrammatic view illustrating the panel with both sides thereof at their raised positions relative to the frame of the ventilating unit.

The overall operation of the present invention is diagrammatically illustrated in FIGS. 7–9. In most instances, the ventilation unit 10 is disposed in the top wall of the vehicle, and one of the side edges of the panel 16 which is raised and lowered by a linkage assembly 18 is positioned to face forwardly of the vehicle while the other side edge of the panel 16 operated by a linkage assembly 18 faces rearwardly of the vehicle.

Accordingly, the operator of the vehicle has a number of options in selecting a desired ventilation flow path, and each option is quickly and easily available to the operator. Thus, as best seen in FIGS. 7–9, the right hand end of the ventilation unit 10 is facing forwardly of the vehicle to which it is attached, and if the operator wants to only admit outside ventilating air into the vehicle, the drive motor 20 of the linkage assembly 18 attached to the front side edge of the panel 16 is operated, and the front edge of the panel 16 is thereby raised relative to the frame 12 in the manner described above, whereupon the ventilation opening 12' in the frame 12 is opened at the front edge thereof as illustrated in FIG. 7 so that ventilating air can pass into and out of the vehicle through the ventilation opening 12'. Obviously, if the vehicle is moving in a forward direction, the disposition of the panel 16 as illustrated in FIG. 7, combined with the forward motion of the vehicle, will combine to cause outside ventilating air to be forced into the vehicle through the ventilation opening 12'.

Similarly, as illustrated in FIG. 8, the operator may also elect to energize the drive motor 20 of the linkage assembly 18 attached to the rear side edge of the panel 16, whereupon only the rear side edge of the panel 16 is disposed in the raised position. If the vehicle is moving in a forward direction, the air flow over and around the ventilation unit 10 will tend to create a vacuum that will withdraw air from the inside of the vehicle and thereby set up a flow of ventilating air into the vehicle through conventional ventilating ducts in the vehicle itself and outwardly through the ventilating unit 10.

If desired, the operator can also raise both the front and rear side edges of the panel 16 as illustrated in FIG. 9, whereupon maximum ventilation is obtained around the entire periphery of the ventilation opening 12' in the frame 12.

Thus, the independent operation of the two drive motors 20 and the linkage assemblies 18 provide the operator of the vehicle with a variety of options in obtaining a desired flow pattern of ventilating air through the vehicle, and the panel 16 can be quickly and easily raised at either or both side edges thereof by operating either or both of the switches 58, and it is not necessary to go through an entire sequence of movements to obtain the desired position of the panel 16 as is the case with the known ventilation units discussed above.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments,

What is claimed is:

1. A selectively openable ventilation device for use in vehicles which includes:

a) a frame mountable in a wall of the vehicle and being formed with a ventilation opening therein;

b) a panel having a configuration corresponding generally to said ventilation opening and having two opposed sides;

c) a first linkage connecting one said side of said panel to said frame for permitting movement of said one side of said panel between a first closed position at which said one side is disposed within said frame to close said ventilation opening thereat and a second open position at which said one side is disposed in a raised position above said frame to open said ventilation opening thereat;

d) a second linkage connecting the other said side of said panel to said frame for permitting movement of said other side of said panel between a first closed position at which said other side is disposed within said frame to close said ventilation opening thereat and a second open position at which said other side is disposed in a raised position above said frame to open said ventilation opening thereat;

e) a first motor operatively connected to said first linkage to selectively move said one side edge of said panel between said first and second positions thereof;

f) a second motor operatively connected to said second linkage to selectively move said other side edge of said panel between said first and second positions thereof, said second motor being operable independently of said first motor whereby either or both of said sides of said panel can be selectively moved toward and way from said frame to permit ventilating air to flow through said ventilation opening at either or both of said sides of said panel; and g) wherein said first and second linkages each include a pair of spaced mounting brackets having slots therein, and a crossbar positioned in said slots and connected to said motor to be moved in said slots by said motor.

2. A selectively openable ventilation device as defined in claim 1, wherein said first motor is an electric motor operated by a first control switch mountable within the vehicle and said control switch being operable to selectively move said one side of said panel between said open and closed position and to selectively stop said movement at any desired intermediate position between said open and closed positions.

3. A selectively openable ventilation device as defined in claim 1, wherein said second motor is an electric motor operated by a second control switch mountable within the vehicle and said control switch being operable to selectively move said other side of said panel between said open and closed position and to selectively stop said movement at any desired intermediate position between said open and closed positions.

4. A selectively openable ventilation device as defined in claim 1, wherein said slots of said first and second linkages extend downwardly and said first and second linkages each further include a pair of operating links, each operating link being pivotally connected at one of its ends to said crossbar and at the other of its ends to one of said panel sides, whereby when said crossbar is moved downwardly in said slots by said motor said operating links cause said one panel side to be moved from said first closed position thereof to said second open position, and when said crossbar is moved upwardly in said slots by said motor said operating links cause said one panel side to be moved from said second open position thereof to said first closed position thereof.

5. A selectively openable ventilation device as defined in claim 4, wherein at least one of said operating links has a pin extending outwardly therefrom, and wherein a spring biased latching member is mounted for movement between a first latching position at which it engages said pin to maintain said one panel said at its first closed position and a second release position at which it disengages said pin to permit movement of said pin in said slot in said bracket.

6. A selectively openable ventilation device as defined in claim 5, wherein said latching member is mounted on said bracket for sliding movement relative thereto between said first latching position and said second release position and is formed with a hook shaped surface positioned to engage said pin during the last portion of said upward movement of said crossbar in said slot, and wherein said crossbar engages said latching member to move said latching member in a direction that will cause said hook shaped surface thereof to urge said pin upwardly when said latching member is in said first latching position and thereby maintain said panel securely pressed against said frame at said first closed position thereof to seal said ventilating opening thereat.

* * * * *